A. LATHROP, J. M. SCHWEIZER & W. T. JOHNSTON.
ECCENTRIC CAM BRAKE.
APPLICATION FILED JAN. 30, 1911.
989,374.
Patented Apr. 11, 1911.
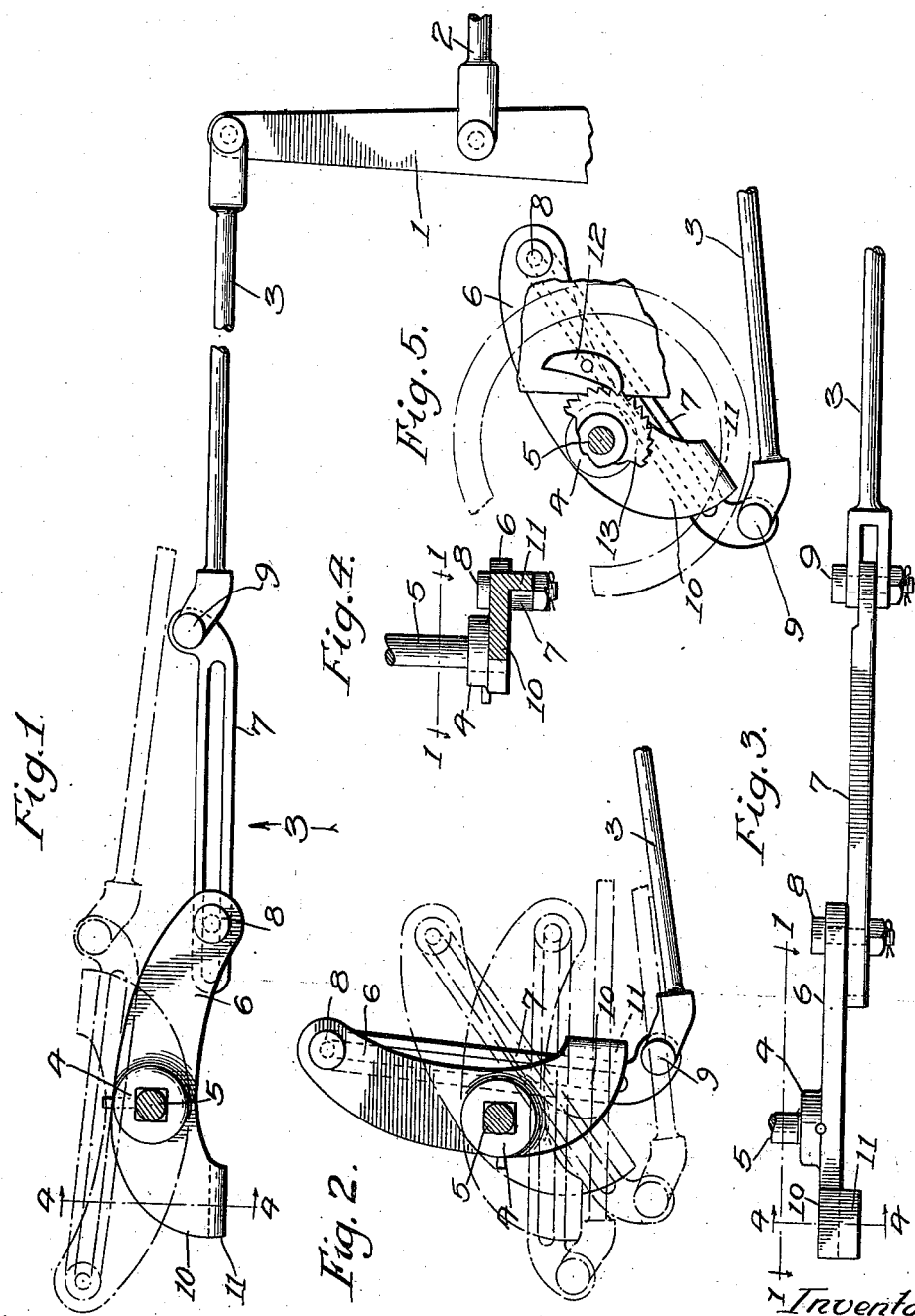
Witnesses:
Inventors
Albert Lathrop,
John M. Schweizer,
William T. Johnston,
by Semer G. Wells,
Attorney.

UNITED STATES PATENT OFFICE.

ALBERT LATHROP, JOHN M. SCHWEIZER, AND WILLIAM T. JOHNSTON, OF COLTON, CALIFORNIA.

ECCENTRIC-CAM BRAKE.

989,374. Specification of Letters Patent. Patented Apr. 11, 1911.

Application filed January 30, 1911. Serial No. 605,569.

*To all whom it may concern:*

Be it known that we, ALBERT LATHROP, JOHN M. SCHWEIZER, and WILLIAM T. JOHNSTON, citizens of the United States, residing at Colton, California, have invented a new and useful Eccentric-Cam Brake, of which the following is a specification.

Our object is to produce a car brake which may be operated either with the air brake system or by hand and to provide the hand operated mechanism with means for giving the brakes an extra pull in emergencies; and our invention consists of the novel features herein shown and described and claimed.

In the drawings: Figure 1 is a plan of mechanism connected with the lower end of the brake staff, the staff being shown in section as indicated by the line 1—1 in Figs. 3 and 4 and the parts being shown in full lines with the brake released and in dotted lines with the brake as ordinarily set by hand. Fig. 2 is a view analogous to Fig. 1 and showing the brake set still tighter than Fig. 1 in full lines and showing the brake set up to the limit in dotted lines. Fig. 3 is a side elevation of the parts shown in Fig. 1 as seen looking in the direction of the arrow 3. Fig. 4 is a cross sectional detail on the lines 4—4 of Figs. 1 and 3. Fig. 5 is a view analogous to Figs. 1 and 2 and showing the brakes set up nearly to the limit and held by the pawl and ratchet.

Referring to the drawings in detail: The lever 1 is connected to the air-brake mechanism by the rod 2, the hand brake connecting rod 3 extends from the swinging end of the lever 1. The cam head hub 4 is fixed upon the lower end of the brake staff 5, the lower end of the brake staff being flush with the lower face of the cam head hub, as shown in Figs. 3 and 4. The crank arm 6 extends from the hub 4 and the slotted connecting rod section 7 is connected to the outer end of the crank arm 6 by the pivot pin 8 and to the rod 3 by the pivot pin 9. The emergency crank arm 10 extends from the hub 4 in the opposite direction from the crank arm 6 and the stop lug 11 extends downwardly from the outer end of the crank arm 10.

When the hand brake mechanism is in its normal released position, as in Fig. 1, the air-brake mechanism may work the lever 1 forwardly and backwardly, the pivot 8 sliding in the slot of the section 7. When it is desired to work the hand brake mechanism, the brake staff 5 is rotated carrying the crank arm 8 slightly more than half a circuit, as indicated in dotted lines in Fig. 1, and the slotted connecting rod section 7 passes the lower end of the brake staff 5 against the lug 11, thereby setting the brakes and locking the hand brake mechanism so that it will hold. If, however, the brakes are not tight enough for an emergency, the brake staff 5 is operated still farther, the lug 11 engaging against the section 7 and carrying it around, as shown in Fig. 2 and during this operation if it is desired to hold the brake the pawl 12 engages the ratchet wheel 13 fixed upon the brake staff 5 and continued operation of the brake staff will carry the parts to the position shown in Fig. 2, thereby setting the brakes as tight as possible and the pawl and ratchet 12 and 13, will hold.

We call special attention to the slotted connecting rod section 7 which allows the air-brake system to work without in any way moving the hand brake system and to the emergency crank arm 10 and lug 11 engaging the slotted connecting rod 7 and the pawl and ratchet 12 and 13 holding the brake staff against the force exerted upon the lug 11.

We claim:

1. An eccentric cam brake comprising the combination with the brake staff, of a crank arm fixed upon the lower end of the brake staff, a slotted connecting rod section pivotally and slidingly connected to the crank arm, a second crank arm extending in the opposite direction from the first crank arm, and a stop lug extending downwardly from the outer end of the second crank arm in position to engage the slotted connecting rod section.

2. An eccentric cam brake comprising the combination with a brake staff, of a crank arm extending from the lower end of the brake staff, a slotted connecting rod section pivotally connected to the crank arm, a second crank arm extending in the opposite direction from the first crank arm, and a stop lug extending downwardly from the outer end of the second crank arm in position to engage the slotted connecting rod section, the stop lug being located at one side of a diametrical line extending from the pivot of the first crank arm.

3. An eccentric cam brake comprising the combination with a brake staff, of a crank arm extending from the lower end of the brake staff, a slotted connecting rod section pivotally connected to the crank arm, a second crank arm extending in the opposite direction from the first crank arm, a stop lug extending downwardly from the outer end of the second crank arm in position to engage the slotted connecting rod section, the stop lug being located at one side of a diametrical line extending from the pivot of the first crank arm, and a pawl and ratchet for holding the brake staff.

ALBERT LATHROP.
JOHN M. SCHWEIZER.
WILLIAM T. JOHNSTON.

Witnesses:
J. R. BURNS,
DAVID O. LEWIS.

Copies of this patent may be obtained for five cents each, by addressing the "Commissioner of Patents Washington, D. C."